US009565945B2

(12) United States Patent
Deskevich et al.

(10) Patent No.: US 9,565,945 B2
(45) Date of Patent: Feb. 14, 2017

(54) SEATING DEVICE HAVING A HEIGHT ADJUSTMENT MECHANISM

(71) Applicant: Knoll, Inc., East Greenville, PA (US)

(72) Inventors: Adam Deskevich, Pennsburg, PA (US); Michael Harper, Bethlehem, PA (US); Andrew Blair Hector, Red Hill, PA (US); Jeffrey P. Lee, Mertztown, PA (US); Robert A. Melhuish, East Greenville, PA (US); Hendrik R. Van Hekken, Allentown, PA (US)

(73) Assignee: Knoll, Inc., East Greenville, PA (US)

( * ) Notice: Subject to any disclaimer, the term of this patent is extended or adjusted under 35 U.S.C. 154(b) by 0 days.

(21) Appl. No.: 15/150,599

(22) Filed: May 10, 2016

(65) Prior Publication Data

US 2016/0331139 A1 Nov. 17, 2016

Related U.S. Application Data

(60) Provisional application No. 62/167,443, filed on May 28, 2015, provisional application No. 62/166,938, filed on May 27, 2015, provisional application No. 62/162,163, filed on May 15, 2015.

(51) Int. Cl.
  *A47C 3/22* (2006.01)
  *A47C 3/40* (2006.01)
  *A47C 7/00* (2006.01)
  *F16H 25/20* (2006.01)

(52) U.S. Cl.
  CPC . *A47C 3/22* (2013.01); *A47C 3/40* (2013.01); *A47C 7/004* (2013.01); *F16H 25/20* (2013.01)

(58) Field of Classification Search
  None
  See application file for complete search history.

(56) References Cited

U.S. PATENT DOCUMENTS

| 3,312,437 A | 4/1967 | Barth |
| 4,130,263 A | 12/1978 | Roericht |
| 4,738,487 A | 4/1988 | Shalinsky et al. |

(Continued)

OTHER PUBLICATIONS

International Search Report for PCT/US2016/031724 dated Jul. 27, 2016.

(Continued)

*Primary Examiner* — David E. Allred
(74) *Attorney, Agent, or Firm* — Buchanan Ingersoll & Rooney PC (57) ABSTRACT

A seating device can include a height adjustment mechanism that permits a height of a seat to be adjusted. The height adjustment device can be configured so that a user may provide a force to provide upward height adjustment and may also provide a force to allowing for a controlled downward height adjustment of the seat. The height adjustment device can include an actuator that is connected to a rotatable member via linkages. An end of one of the linkages may engage the rotatable member to prevent rotation of the rotatable member, which can prevent height adjustment of the seat. Movement of the actuator may cause the linkages to move so that the rotatable member is free to rotate so that a user may provide a force on the seat to effect height adjustment of the seat and/or cause the seat to be lowered at a desired speed.

15 Claims, 4 Drawing Sheets

(56) References Cited

U.S. PATENT DOCUMENTS

| | | | |
|---|---|---|---|
| 4,747,319 A * | 5/1988 | Sakuta | B62D 33/07 |
| | | | 74/411.5 |
| 4,750,701 A | 6/1988 | Folson et al. | |
| 4,968,094 A | 11/1990 | Froyland et al. | |
| 5,112,103 A | 5/1992 | Downer | |
| 5,683,139 A | 11/1997 | Golynsky et al. | |
| 6,116,103 A * | 9/2000 | Heckel, Jr. | F16H 25/20 |
| | | | 188/69 |
| 6,817,667 B2 | 11/2004 | Pennington et al. | |
| 6,824,218 B1 | 11/2004 | van Hekken | |
| 6,834,916 B2 | 12/2004 | Volkman et al. | |
| 6,997,511 B2 | 2/2006 | Marchand et al. | |
| 7,198,329 B1 | 4/2007 | Larson | |
| 7,478,878 B2 | 1/2009 | Oettinger | |
| 7,887,131 B2 | 2/2011 | Chadwick et al. | |
| 8,029,060 B2 | 10/2011 | Parker et al. | |
| 8,136,876 B2 | 3/2012 | Bellvis Castillo et al. | |
| 8,157,329 B2 | 4/2012 | Masoud et al. | |
| 8,167,373 B2 | 5/2012 | Allison et al. | |
| 8,216,416 B2 | 7/2012 | Allison et al. | |
| 8,220,872 B2 | 7/2012 | Hong | |
| D664,779 S | 8/2012 | Weber et al. | |
| 8,480,171 B2 | 7/2013 | Chadwick et al. | |
| 8,646,841 B2 | 2/2014 | Molnar | |
| 8,663,514 B2 | 3/2014 | Deskevich et al. | |
| 8,764,117 B2 | 7/2014 | Van Hekken et al. | |
| 2003/0168901 A1 | 9/2003 | Wilkerson et al. | |
| 2006/0006715 A1 | 1/2006 | Chadwick et al. | |
| 2006/0226691 A1 | 10/2006 | Bedford et al. | |
| 2007/0158993 A1 * | 7/2007 | Groelsma | A47C 1/03255 |
| | | | 297/423.38 |
| 2008/0290712 A1 | 11/2008 | Parker et al. | |
| 2010/0152671 A1 * | 6/2010 | Raab | A61M 5/31551 |
| | | | 604/207 |
| 2011/0238187 A1 * | 9/2011 | Evans | A45B 9/00 |
| | | | 623/27 |
| 2014/0150579 A1 * | 6/2014 | Li | F16H 25/02 |
| | | | 74/89.29 |
| 2014/0311265 A1 * | 10/2014 | Duck | F16H 25/20 |
| | | | 74/89.23 |
| 2015/0238014 A1 * | 8/2015 | Kessler | A47C 7/004 |
| | | | 297/423.1 |

OTHER PUBLICATIONS

Written Opinion of the International Searching Authority for PCT/US2016/031724 dated Jul. 27, 2016.

* cited by examiner

SEATING DEVICE HAVING A HEIGHT ADJUSTMENT MECHANISM

CROSS-REFERENCE TO RELATED APPLICATIONS

The present application claims priority to U.S. Provisional Patent Application No. 62/162,163, which was filed on May 15, 2015, and also claims priority to U.S. Provisional Patent Application No. 62/166,938 filed on May 27, 2015 and 62/167,443 filed on May 28, 2015. The entirety of U.S. Provisional Application Nos. 62/162,163 and 62/167,443 are incorporated by reference herein.

FIELD OF INVENTION

The innovation relates to seating devices such as chairs, stools, and sit/stand stools.

BACKGROUND OF THE INVENTION

Chairs often include a base that supports a seat and/or a backrest. Some types of chairs are configured as stools. Some types of stools may not include a backrest. Of course, other types of chairs may also be configured to not include a backrest. Examples of chairs, stools, and other types of seating devices may be appreciated from U.S. Pat. Nos. 8,646,841, 8,136,876, 7,478,878, 6,834,916, 5,112,103, 4,130,263, 3,312,437, and D664,779. Other types of chairs such as lounge chairs or office chairs may have a backrest. Examples of such chairs may be appreciated from U.S. Pat. Nos. 8,764,117, 8,663,514, 8,480,171, 8,220,872, 8,216,416, 8,167,373, 8,157,329, 8,029,060, 7,887,131, 7,198,329, 6,997,511, 6,824,218, 6,817,667, 5,683,139, and 4,738,487 and U.S. Pat. App. Pub. Nos. 2003/0168901, 2006/0006715, and 2008/0290712.

SUMMARY OF THE INVENTION

A seating device, a height adjustment mechanism for a seating device, and methods of making and using the same are provided. The seating device can be configured so that height actuation of at least a seat (and also a back that may be attached to the seat) can be provided for by a user actuating a mechanism to unlock a height adjustment device and subsequently apply a force to raise the seat and/or back or limit an amount of force provided so that the height of the seat and/or back may be lowered via gravity. A safety mechanism can be included that is configured to prevent height adjustment while a user is sitting on the seat of the seating device. Embodiments of the seating device may be configured as a chair, a stool, or other type of seating device such as a sit/stand stool.

A height adjustment device for a seating device is provided that can include an actuator, a first linkage connected to the actuator, and a second linkage connected to the first linkage. The second linkage can have a first end and a second end opposite the first end of the second linkage. The height adjustment device can also include a rotatable member having a plurality of spaced apart projections that define a plurality of spaced apart recesses. Each of the recesses can be sized and shaped to receive the first end of the second linkage for locking engagement with projections that define that recess.

Embodiments of the height adjustment device can also include a shaft having a first end and a second end opposite the first end of the shaft. The second end of the shaft can be attached to the rotatable member such that rotation of the shaft causes the rotatable member to rotate. The shaft may be coupled to the rotatable member via a fastener such as a bolt of screw that passes through the rotatable member and has an end position in the shaft. The shaft can have at least one thread that is mateable with at least one thread defined in a portion of a base of a seating device such that linear motion of the shaft in a first linear direction causes the shaft to rotate in a first rotational direction during that linear motion of the shaft in the first direction of linear motion and linear motion of the shaft in a second linear direction of linear motion that is opposite the first direction of linear motion causes the shaft to rotate in a second rotational direction that is opposite the first rotational direction during linear motion of the shaft in the second direction of linear motion.

The height adjustment mechanism can also include a plurality of ring elements connected to the shaft to induce friction during motion of the shaft in one of the first direction of linear motion and the second direction of linear motion and/or a plurality of ring elements connected to a housing that at least partially defines a cavity that at least partially encloses the shaft where the shaft passes through the ring elements connected to the housing to induce friction during motion of the shaft in one of the first direction of linear motion and the second direction of linear motion. When ring elements are connected to the shaft are present with ring elements connected to the housing, the ring elements connected to the housing can be spaced apart from each other and be positioned such that at least one ring element of the ring elements connected to the shaft is positioned between immediately adjacent ring elements connected to the housing. The ring elements connected to the shaft can be spaced apart from each other and be positioned such that at least one ring element of the ring elements connected to the housing is positioned between immediately adjacent ring elements connected to the shaft.

In some embodiments, the second linkage can have or define a cavity. A first spring can be positioned within the cavity of the second linkage. A second spring can be positioned adjacent the second end of the second linkage to provide a biasing force that acts against the second end of the second linkage to bias the first end of the second linkage toward the rotatable member. The first spring can be positioned within the cavity such that the first spring compresses from a first length to a second shorter length when a downward force acts on the rotatable member or a seat of the seating device to lower the position of the seat and/or rotatable member. The first end of the second linkage can maintain a position within a recess of the rotatable member when the first spring is compressed to the second length of the first spring. The first spring can be maintained at the first length of the first spring when the downward force does not act on the rotatable member such that the second spring is compressible from a first length to a second shorter length when the actuator is moved from a first position to a second position. The first and second springs can be positioned such that the first spring is compressible from the first length of the first spring to the second length of the first spring while the second spring is maintained at the first length of the second spring. In some embodiments, the first spring can be connected between the first linkage and the second linkage and the second spring can be positioned between a wall and the second end of the second linkage.

The height adjustment mechanism can also include a guide having a slot that receives a projection extending from the first linkage. The slot can define a path of travel of the first linkage such that the projection moves along the slot when the actuator is moved from the first position to the second position.

A seating device is also provided that can include a seat, a base connected to the seat to support the seat on a floor, and a height adjustment mechanism connected to the base such that actuation of the height adjustment mechanism facilitates height adjustment of the seat. The height adjustment mechanism can include an actuator, a first linkage connected to the actuator, and a second linkage connected to the first linkage. The second linkage can have a first end and a second end opposite the first end of the second linkage. A rotatable member can be positioned near the second linkage and having a plurality of spaced apart projections that define a plurality of spaced apart recesses such that each of the recesses is sized and shaped to receive the first end of the second linkage for locking engagement with projections that define that recess. In some embodiments, the second linkage can define a cavity and a first spring can be positioned within the cavity of the second linkage. A second spring can be positioned adjacent the second end of the second linkage to provide a biasing force that acts against the second end of the second linkage to bias the first end of the second linkage toward the rotatable member. The first spring can be positioned within the cavity of the second linkage such that the first spring compresses from a first length to a second length that is shorter than the first length when a downward force acts on the seat so that the first end of the second linkage maintains a position within a recess of the rotatable member when the first spring is compressed to the second length of the first spring. The first spring can be maintained at the first length of the first spring when the downward force does not act on the seat such that the second spring is compressed from a first length to a second shorter length when the actuator is moved from a first position to a second position. The first end of the second linkage can move away from the rotatable member such that the first end of the second linkage is moved out of engagement with the projections of the rotatable member when the second spring is compressed to the second length of the second spring when the actuator is moved from the first position to the second position. The first and second springs can be positioned such that the first spring is compressible from the first length of the first spring to the second length of the first spring while the second spring is maintained at the first length of the second spring when the first spring is at the second length of the first spring.

Embodiments of the seating device can also include a shaft having a first end and a second end opposite the first end of the shaft. The second end of the shaft can be attached to the rotatable member such that rotation of the shaft causes the rotatable member to rotate. The first end of the shaft can be connected to the base of the seating device such that rotation of the shaft results in height adjustment of the seat.

The height adjustment mechanism of the seating device can also include a plurality of ring elements connected to the shaft to induce friction during motion of the shaft in one of a first direction of linear motion and second direction of linear motion of the shaft that occurs when the shaft rotates. A plurality of ring elements can also (or alternatively) connected to a housing that at least partially defines a cavity that at least partially encloses the shaft, the shaft passing through the ring elements connected to the housing to induce friction during motion of the shaft in one of the first direction of linear motion and the second direction of linear motion. For embodiments having ring elements connected to the shaft and also ring elements connected to the housing, the ring elements connected to the housing can be spaced apart from each other and be positioned such that at least one ring element of the ring elements connected to the shaft is positioned between immediately adjacent ring elements connected to the housing and the ring elements connected to the shaft can be spaced apart from each other and be positioned such that at least one ring element of the ring elements connected to the housing is positioned between immediately adjacent ring elements connected to the shaft.

Other details, objects, and advantages of the invention will become apparent as the following description of certain exemplary embodiments thereof and certain exemplary methods of practicing the same proceeds.

BRIEF DESCRIPTION OF THE DRAWINGS

Exemplary embodiments of a seating device having a height adjustment mechanism and embodiments of the height adjustment mechanism are shown in the accompanying drawings and certain exemplary methods of making and practicing the same are also illustrated therein. It should be appreciated that like reference numbers used in the drawings may identify like components.

DETAILED DESCRIPTION OF EXEMPLARY EMBODIMENTS

Referring to FIGS. 1-4 a seating device 1 can include a base 3 that supports a seat 2. The seat can include a frame 5 that attaches a seating surface 4 to the base 3 so that the seating surface 4 of the seat 2 is supportable on a floor. The seating surface 4 can be the upper surface of a fabric coated cushion, an upper surface of a seating cushion, an upper surface of an upholstered cushion, a tensioned fabric material, a tensioned elastomeric member, a polymeric seating member, a saddle, or other member that may be configured to define a seating surface for supporting a portion of a person's body (e.g. the persons buttocks, thighs, and/or back, etc.) when that person sits or leans on the seating surface 4 of the seat 2.

The seat frame 5 can include a first member 5a and second member 5b that extend from the member defining the seating surface (or from adjacent that member) to an elongated support connecting member 9 of the base 3 of the seating device 1. The first and second members 5a and 5b of the seat frame 5 may each be elongated elastomeric members that are shaped such that each member curves outwardly from below the seating surface 4 to an outer position and subsequently curves inwardly toward an elongated vertical base member 9 that extends from the foot 7 of the base toward the seat 2 for supporting the seat 2. In some embodiments, the first and second members 5a and 5b of the seat frame may be portions of a unitary elastomeric member that has a generally triangular shape having a first linearly extending side 5c attached to the seating surface 4 underneath the sating surface and opposite the first and second members 5a and 5b that extend downwardly from the first linearly extending side to define second and third sides of the triangularly shaped seat frame 5.

The elongated support connecting member 9, may include a generally tubular structure or other type of elongated member. In some embodiments, the elongated support connecting member 9 may include a member that is structured as a pipe, tube, or other type of linearly extending elongated member 9c having an inner channel defined therein that is integrally attached to multiple upper elements to define a generally "Y" shaped member. For instance, the elongated support connecting member 9 can also include a first upper element 9a and a second upper element 9b that extend upwardly and outwardly from an upper end of a linearly extending member 9c so that these elements extend upwardly adjacent to the first and second members 5a and 5b of the seat frame for attachment to those members. For instance, the first upper element 9a can be attached to the underside of the first member 5a of the seat frame 5 and the second upper element can be attached to the underside of the second frame member 5b of the seat frame 5 via one or more fasteners, welding, an adhesive, and/or other type of attachment mechanism.

The linearly extending elongated member 9c of the elongated connecting member 9 can have a lower end attached to the foot 7 of the base 3. The foot 7 can include a bottom floor engaging member 7a that is configured to engage a floor on which the seating device 1 is positioned. The bottom floor engaging member 7a can be attached to a bottom foot frame member 7d. The foot 7 can also include first and second upwardly extending foot members 7b and 7c that extend upwardly and inwardly from adjacent opposite ends of the bottom floor engaging member 7a. For instance, the first upwardly extending foot member 7b can extend upwardly and inwardly from a first end of the bottom foot frame member 7d to adjacent the lower end of the linearly extending member 9c. The second upwardly extending foot member 7c can extend upwardly and inwardly from the second end of the bottom foot frame member 7d to adjacent the lower end of the linearly extending member 9c.

The frame of the foot 7 can also include an upwardly extending member 7e that extends from the uppermost ends of the first and second upwardly extending foot members 7b and 7c within an inner channel defined in the linearly extending member 9c of the elongated connecting member 9. The upwardly extending member 7e may be welded, fastened, and/or otherwise connected to the linearly extending member inside of the inner channel of the linearly extending member 9c.

The height of the seating surface 4 can be set based on the size and shape of the foot 7, the elongated connecting member 9, and the seat frame 5. The height of the seating surface 4 can also be adjustable so that this height may be lowered from a first position to a second position that is vertically lower than the first position and also raised from the first position or lowered second position to a third position that is vertically higher than the first position and is also vertically higher than the second position. The seating device 1 can include a height adjustment mechanism 21 to provide such height adjustability of the seating surface 4.

The height adjustment mechanism 21 can include a button, lever, or other type of actuator 11 that is positioned adjacent to the first member 5a of the seat frame 5 and the first upper element 9a of the elongated support connecting member 9. The actuator 11 can be connected to at least one other component of the height adjustment mechanism 21 such that movement of the actuator from a first position to a second position adjusts the height adjustment mechanism from a locked position to an unlocked position. Once in the unlocked position via motion of the actuator 11, a user may apply an upward force on the seating surface 4 or seat frame 5 to cause the seating surface to move to a higher vertical position or may allow the seating surface 4 to drop via gravity and/or provide a downward force to cause the seating surface 4 and seat frame 5 to move to a lower vertical position. In some embodiments, the height adjustment mechanism 21 may be configured so that the actuator 11 must be moved to its unlocked position and maintained in its unlocked second position to allow vertical adjustment of the seating surface.

In other embodiments, it is contemplated that the height adjustment mechanism 21 can be configured so that providing a first force at a first time moves the actuator to its unlocked position and results in the actuator 11 staying in its unlocked position for permitting height adjustment of the seating surface 4 and a second force has to be provided by a user to the actuator 11 to adjust the position of the actuator 11 back to its first locking position to move the actuator 11 back to its locking position.

Figure 1:
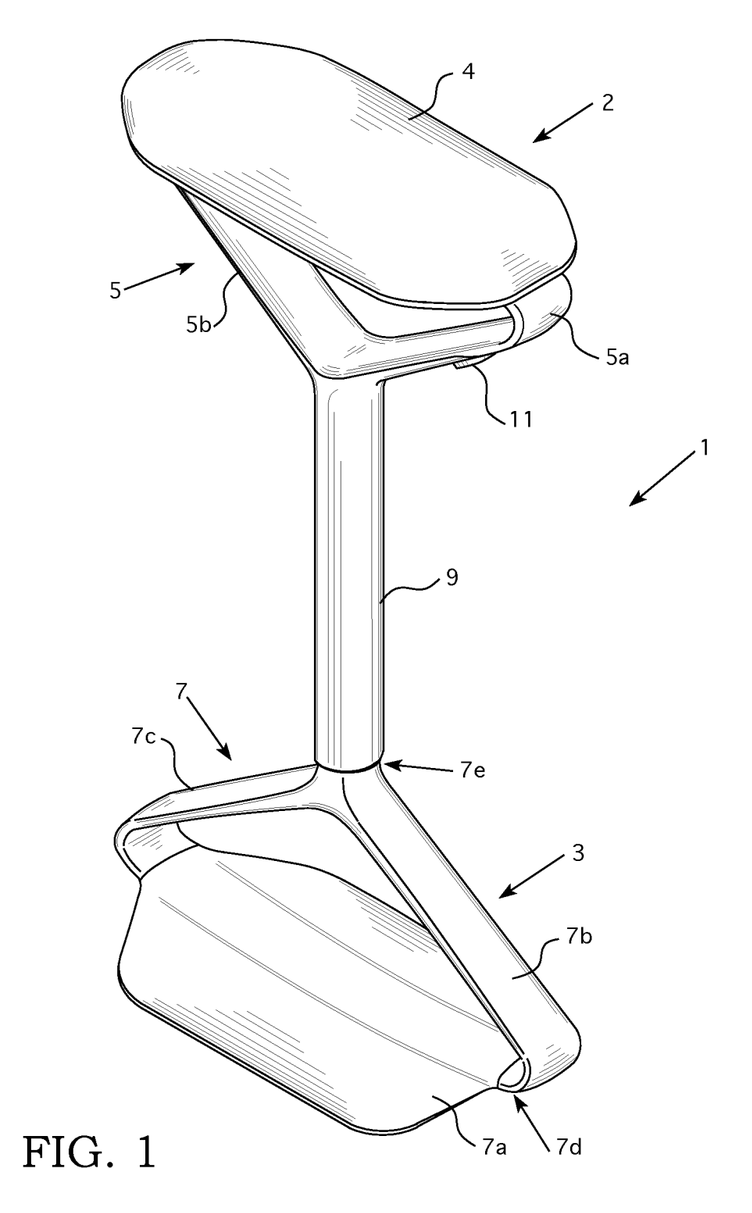
FIG. 1 is a perspective view of a first exemplary embodiment of a seating device.
Figure 2:
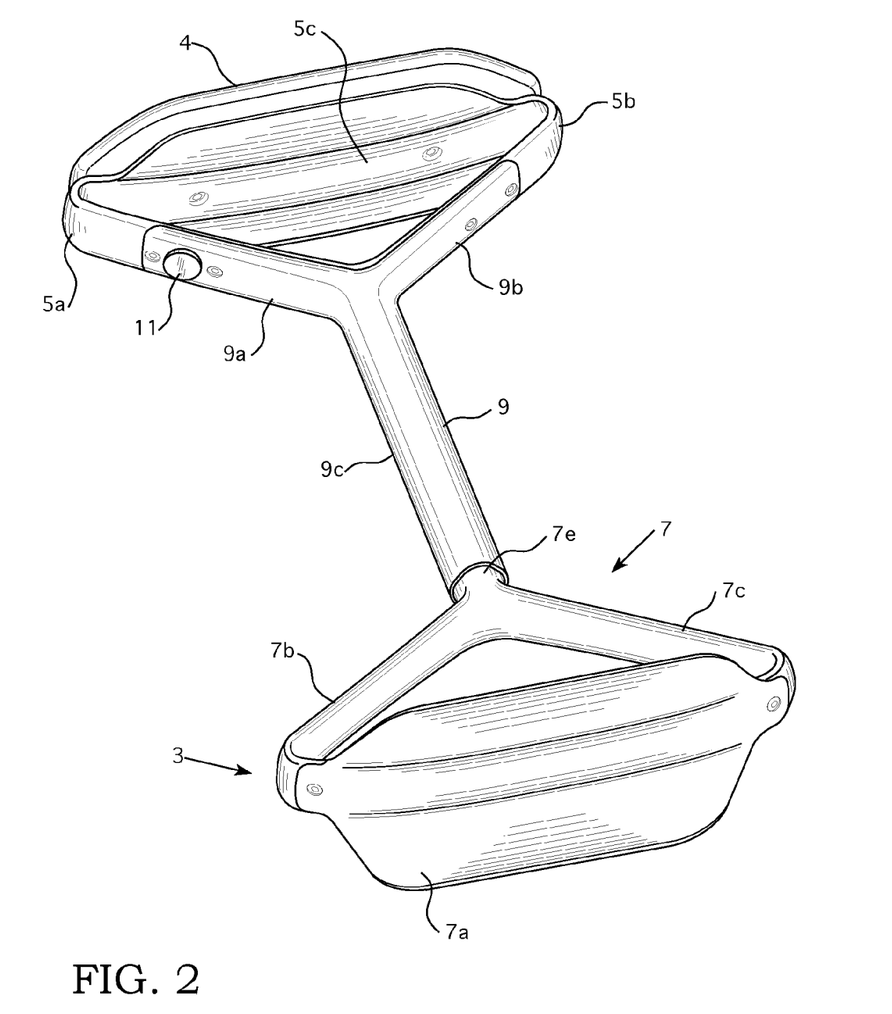
FIG. 2 is a bottom perspective view of the first exemplary embodiment of the seating device.
Figure 3:
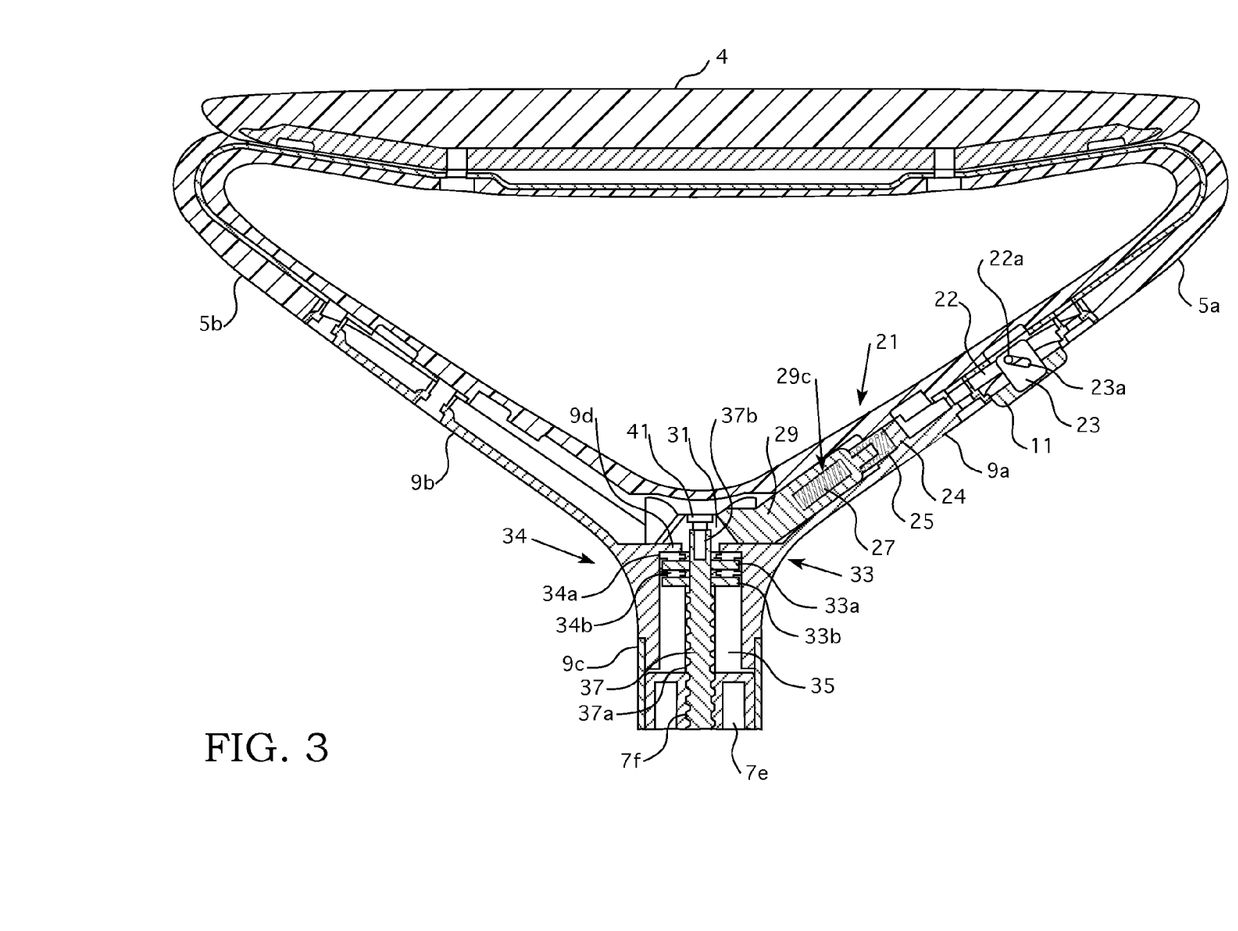
FIG. 3 is a fragmentary cross-section view of the first exemplary embodiment of the seating device.
Figure 4:
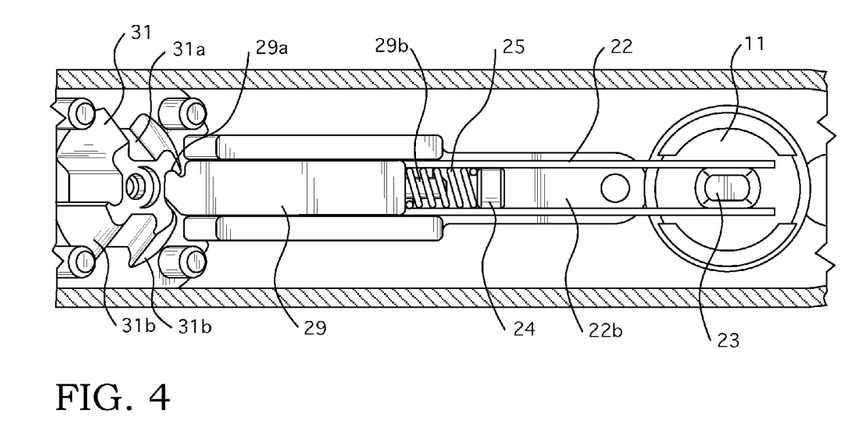
FIG. 4 is a fragmentary top view of the height adjustment mechanism of the first exemplary embodiment of the seating device.

The height adjustment mechanism 21 can include a number of components that are connected together that are operatively connected to the actuator 11 so that motion of the actuator can unlock and lock the height adjustment mechanism 21. For instance, the height adjustment mechanism can include a first linkage 22 connected to the actuator 11, a second linkage 29 connected to the first linkage 22, and a rotatable member 31 having projections 31b that are spaced apart from each other by recesses 31a defined between the projections 31b in the body of the rotatable member 31. The actuator 11 can be coupled to the first linkage 22 such that motion of the actuator 11 in a first direction causes the first linkage 22 to move, which can be configured to cause the second linkage 29 to move toward the rotatable member 31 for locking engagement with the rotatable member 31. In some embodiments, the motion of the actuator in the first direction can be provided via at least one biasing device connected to the first linkage, second linkage and/or the actuator 11. In yet other embodiments, the motion of the actuator in the first direction may be driven by a force provided by a user.

The actuator 11 can be connected to the first linkage 22 such that motion of the actuator 11 in a second direction that is opposite the first direction causes the first linkage 22 to move so that the second linkage 29 moves away from the rotatable member 31 to be out of engagement with the rotatable member 31 so that the rotatable member 31 is unlocked and allowed to rotate. In some embodiments, the motion of the actuator 11 in the second direction can be driven by a force provided by a user that is configured to overcome a biasing force providing by a biasing mechanism.

In some embodiments, the actuator 11 can be configured to move in a second direction that is an inward direction such that the actuator 11 moves toward the seating surface 4 and/or the seat frame 5 when moving in the second direction and may move in an outward direction when moving in the first direction such that the actuator moves away from the seat frame 5 and/or seating surface 4 when moving in the first direction. In other embodiments, the motion of the actuator may be configured to move sidewardly to effect locking and unlocking adjustments to the height adjustment mechanism. In yet other embodiments, the actuator can be configured so that rotational movement of the actuator in a clockwise or counterclockwise direction is configured to actuate unlocking of the height adjustment mechanism and rotational movement in an opposite second direction effect a locking of the height adjustment mechanism.

In some embodiments, the rotatable member 31 can be configured as a ratchet or a gear, the first linkage 22 can be configured as an elongated linkage element, and the second linkage 29 can be configured as a latch. For instance, the second linkage 29 can be configured as a latch that has a first end 29a and a second end 29b opposite its first end 29a. The first end 29a of the second linkage 29 can be configured to fit within each of the recesses 31a of the rotatable member 31 for providing an interlocking fit between immediately adjacent projections 31b that are spaced apart from each other by the recess 31a in which that first end 29a is received. When positioned within a recess, the first end 29a can prevent the rotatable member 31 from rotating.

The rotatable member 31 can be connected to a shaft 37 so that the rotatable member 31 rotates when the shaft 37 rotates. For instance, a first end of the shaft 37 can be attached within the upwardly extending member 7e that may be within a channel of the linearly extending elongated member 9c and may extend to a second end 37b that is positioned within a portion of the rotatable member 31. A fastener 41 can extend from the top of the rotatable member 31 to a position located in the second end 37b of the shaft 37 to attach the rotatable member 31 to the shaft 37 such that the rotatable member 31 rotates when the shaft 37 rotates.

That shaft 37 can be positioned within a channel, cavity 35, or other type of aperture that is at least partially defined inside the linearly extending elongated member 9c, the portion of a body defining the first and second upper elements 9a and 9b, and/or a portion of the upwardly extending member 7e of the foot 7 for embodiments where that member is configured to extend along a substantial portion of the linearly extending elongated member 9c, (e.g. an entirety of the length of the linearly extending elongated member 9c or over 80% of the length of the linearly extending elongated member 9c, over 70% of the length of the linearly extending elongated member 9c, etc.) to adjacent the first and second upper elements 9a and 9b. The cavity 35 may also be defined in a housing that can be attached to an upper portion of the linearly extending elongated member 9c that may be configured for attachment to the first and second upper elements 9a and 9b between the upper portion of the linearly extending elongated member 9c and the first and second upper elements 9a and 9b.

In some embodiments, the first end of the shaft 37 may be positioned within a channel defined within the upwardly extending member 7e of the foot 7. An inner surface of the upwardly extending member 7e of the foot 7 may define this channel that receives the first end of the shaft 37. At least one groove or thread 7f may be defined in this inner surface of the upwardly extending member 7e of the foot 7 for contacting one or more threads 37a formed on the exterior surface of the shaft 37 so that the shaft is rotated as it is moved linearly into and out of the channel of the upwardly extending member 7e of the foot 7.

For instance, the shaft 37 may have one or more threads 37a defined thereon, such as at least one helical thread formed on the outer surface of the shaft 37. The one or more threads 37a may mate with one or more threads 7f defined on an inner surface of the upwardly extending member 7e. These mateable threads may be configured to mate such that, when the shaft 37 is moved linearly out of the channel of the upwardly extending member 7e or further into this channel, the shaft 37 rotates via engagement of the mateable threads. The mateable threads of the shaft 37 and the upwardly extending member 7e can be configured so that the shaft 37 is rotated in a first rotational direction (e.g. clockwise or counterclockwise) when the shaft is moved linearly in a first direction upwardly out of the channel of the upwardly extending member 7e. The mateable threads can also be configured so that the shaft 37 is rotated in a second rotational direction that is opposite the first rotational direction (e.g. counterclockwise when the first rotational direction is clockwise and clockwise when the first rotational direction is counterclockwise) when the shaft is moved linearly in a second direction that is downwardly such that the first end of the shaft moves further into the channel of the upwardly extending member 7e.

The rotatable member 31 can be positioned adjacent to an annular support surface 9d defined by a portion of the elongated connecting member 9 (e.g. upper yoke portion defined by an internal wall or other structure defined by the first and second upper elements 9a and 9b and/or an upper end portion of the linearly extending elongated member 9c) or a portion of a housing that may be attached between the first and second upper elements 9a and 9b and the linearly extending elongated member 9c of the elongated connecting member 9. In some embodiments, the annular support surface 9d can be defined by an annular member or a member having a hole that is to be positioned adjacent a top of the cavity 35 to define an upper inner wall of that cavity 35.

The annular support surface 9d may include an inner opening through which the shaft 37 passes for being positioned into a central portion of the rotatable member 31 for attachment to the rotatable member 31. The support surface 9d can be positioned to define an upper wall to the cavity 35 in which the shaft 37 is moveable as the shaft 37 is moved into and out of the upwardly extending member 7e. This upper wall defining the support surface 9d can be configured to contact or otherwise engage at least one ring element of a plurality of ring elements that can be attached to the shaft 37 and/or positioned such that the shaft 37 passes through the ring elements to provide a friction inducing force to control the motion of the shaft 37 as the shaft 37 may move downwardly further into the upwardly extending member 7e.

For instance, the shaft 37 can be attached to a first set of ring elements 34 and/or a second set of ring elements 33. The first set of ring elements can include a first ring element 34a and a second ring element 34b. The second set of ring elements can include a third ring element 33a and a fourth ring element 33b. The third ring element 33a can be positioned between the first and second ring elements 34a and 34b. The second ring element 34b can be positioned between the third and fourth ring elements 33a and 33b. In some embodiments, the ring elements of the first and/or second sets of ring elements 34 and 33 can be positioned on the shaft 37 or positioned adjacent to the shaft 37 such that these ring elements are located adjacent to the second end 37b of the shaft 37 within cavity 35 and above the one or more threads 37a defined on the exterior surface of a portion of the shaft 37. All the ring elements of the first and second sets of ring elements 33 and 34 may be positioned in the cavity such that the shaft 37 passes through inner openings defined in these ring elements.

In some embodiments, the first set of ring elements 34 can include immediately adjacent ring elements that are spaced apart from each other and the second set of ring elements 33 can include immediately adjacent ring elements that are spaced apart from each other. The ring elements of the second set of ring elements 33 can be positioned so that at least one of these ring elements is located between immediately adjacent ring elements of the first set of ring elements 34. For instance, the first ring element 33a of the second set of ring elements 33 can be positioned such that it is between the immediately adjacent first and second ring elements 34a and 34b of the first set of ring elements 34. Additionally, the second ring element 34b of the first set of ring elements 34 can be positioned between the first and second ring elements 33a and 33b of the second set of ring elements 33 within the cavity 35 adjacent to the annular support surface 9d.

In some embodiments, the ring elements of the first and second set of ring elements 33 and 34 can all be attached to the shaft 37 or may all be attached to an inner wall that defines at least a portion of cavity 35, or may be positioned so that the ring elements of one of these sets of ring elements is attached to the shaft 37 and the other set of ring elements is attached to an inner wall that defines at least a portion of the cavity 35 (e.g. an inner wall defined by a portion of the elongated vertical base member 9, an inner wall defined by a housing that at least partially defines cavity 35 that is attached between the first and second upper elements 9a and 9b and the linearly extending elongated member 9c, an inner wall defined by an upper portion of the linearly extending elongated member 9c that at least partially defines the cavity 35, an inner wall defined by an upper portion of the upwardly extending member 7e of the foot at least partially defines the cavity 35, etc.)

The ring elements may be positioned to contact each other to generate friction against the upper wall of the cavity 35 defined by the annular support surface 9d when the seating surface 4 is moved downwardly. For instance, the downward motion of the seating surface 4 and seat frame 5 can drive the shaft 37 downward to be moved further into the channel of upwardly extending member 7e, which causes the shaft 37 to rotate. This downward motion also causes the support surface 9d to be moved downwardly. The ring elements may be connected to the shaft 37 so that their positions on the shaft 37 do not significantly change during rotation of the shaft 37 so that the first ring element 34a directly contacts the support surface 9d so that the first ring element 34a is driven toward the other ring elements so that the ring elements all engage each other during downward motion of the shaft 37 to induce a pre-selected amount of friction during downward motion of the shaft 37 so that such downward motion of the shaft 37 can occur at a more easily controllable speed as the induced friction acts against downward acceleration that can be provided by gravity.

The ring elements can be configured and positioned on the shaft 37 so that they do not significantly contribute to any friction that may occur during upward motion of the shaft 37 that causes the seat frame 5 and seating surface 4 to move to a higher position. For instance, during upward motion, the support surface 9d may be raised with the seating surface 4 and seat frame 5, such that there is no engagement of any of the ring elements during upward motion. In other embodiments, the outer peripheral edges of the ring elements can be configured to engage the inner wall that defines the cavity 35 that may be defined in an upper portion of the elongated support connecting member 9 or housing that may be connected to an upper portion of this member and/or part of an upper portion of this member. The outer peripheral edges of the ring elements can be configured to engage or otherwise contact the inner wall that defines the cavity 35 to induce friction during raising of the seating surface 4 and seat frame 5 to provide a pre-selected amount of friction during such upward motion. In some embodiments, it is contemplated such friction inducing can help cause the motion of the raising of the seating surface 4 and seat frame 5 to move in a smoother fashion. Such positioning and configuration of the ring elements can also contribute to the friction they induce when the shaft 37 moves downwardly as the peripheral edge of the ring elements sliding along the inner wall defining cavity 35 can contribute to the friction induced by the ring elements during lowering of the seating surface 4 and seat frame 5 as well.

In some embodiments, the ring elements may be structured as friction discs. For example, in some embodiments the ring elements may be configured as annular discs or washers that are composed of zinc, zinc plated steel, zinc plated steel with acetyl or nylon, die-cast zinc, another type of metal, a polymeric material, an elastomeric material, a composite material, or a combination of such materials The ring elements of the first set of ring elements 34 may be composed of a first type of material and the second set of ring elements 33 may be composed of a second type of material that is different from the first type of material. For instance, the first type of material may be a type of metal or alloy and the second type of material may be a different type of metal or alloy or a polymeric material or elastomeric material.

In some embodiments, the actuator 11 can be connected to the second linkage 29 to facilitate motion of that second linkage via the first linkage 22 such that the motion of the second linkage 29 into an unlocked position can be prevented when a user is sitting on the seating surface 4 to avoid accidental actuation of seat height adjustment. For instance, the actuator 11 can be connected to the first linkage 22 adjacent to a guide 23 having a slot 23a defined therein that receives a projection 22a of the first linkage 22 (e.g. a pin attached to the first linkage, a detent or protuberance formed on the first linkage, etc.). The guide 23 may be affixed to a portion of the seat frame 5 or to a portion of the first upper element 9a so that the guide 23 is stationary when the actuator 11 moves so that motion of the actuator 11 drives motion of the first linkage 22 along a path defined by the slot 23a that receives the projection 22a. Motion of the actuator 11 from a first locking position to a second unlocked position may cause the projection 22a to move along the slot 23a from a first position to a second position to drive motion of the first linkage 22 along the path defined by the slot 23a. The motion of the first linkage 22 that is driven by motion of the actuator 11 can cause the second linkage 29 to move away from the rotatable member 31 such that the first end 29a of the second linkage 29 moves out of a recess 31a of the rotatable member and out of contact with projections 31b that define that recess 31a.

Releasing of the actuator 11 by a user so that the force provided on the actuator 11 to move the actuator to its unlocked position can result in the actuator moving in a second direction from the unlocked position back to a locked position. A biasing force can be provided by a biasing mechanism to drive such motion of the actuator 11 in response to a user releasing the actuator. The biasing mechanism can be configured to also provide a safety feature to prevent unlocking when a user is sitting on the seating surface 4 or has otherwise placed sufficient pressure or force that exceeds a pre-selected level via his or her body weight on the seating surface 4.

For instance, the height adjustment mechanism 21 can include a first spring 27 and a second spring 25 that can be positioned to help prevent actuation of any seat height adjustment when a user has placed a substantial amount of weight on the seating surface 4 by sitting or leaning on the seating surface 4. For instance, the positioning and functioning of the first and second springs 27 and 25 can be configured so that compression of the first spring 27 occurs to prevent motion of the second linkage 29 for moving to an unlocked position when a user is seated on the seating surface 4. When a user is not seated on the seating surface, the first spring 27 may be configured to not be compressed and the second spring 25 may be compressed due to motion of the first and second linkages 22 and 29 moving to move to an unlocked position. For instance, the first and second springs 27 and 25 may be positioned so that when the first spring 27 is compressed from a first configuration to a second more compressed configuration, the second spring 25 is not undergoing further compression from its first configuration. When the second spring 25 is compressed from a first configuration to a second more compressed configuration, the second spring 27 may not be further compressed and may stay in its first uncompressed configuration.

To facilitate the positioning of the first and second springs 27 and 25, some embodiments may be configured so that the second linkage 29 may have an inner channel 29c defined therein that receives a portion of the first linkage 22 and houses a first spring 27 therein. The first spring 27 may be a coil spring, an elastomeric spring element, or other type of spring. The first spring 27 may be positioned between an end of the first linkage 22 and an inner wall of the second linkage defining a first end of the inner channel 29c that is closer to the rotatable member 31c than the second end of the inner channel 29c.

The second spring 25 can be positioned outside of the second linkage 29. For instance, the second spring 25 can be positioned between the second end 29b of the second linkage 29 and a wall 24 defined by a portion of the elongated support connecting member 9. For instance, the wall 24 can be a rib, inner wall, or other structure defined or formed in the first upper element 9a that is within an aperture in which the first and second linkages 22 and 29 are positioned.

The wall 24 can be positioned inside the first linkage 22. For instance, the first linkage 22 can have an inner opening 22b that is sized and shaped such that the inner wall 24 is positionable therein such that the first linkage 22 is moveable adjacent the wall 24 when the actuator 11 is moved while the wall is affixed in its same location via its attachment to the first upper element 9a. The second spring 25 can extend between the wall 24 and the second end 29b of the second linkage 29. In some embodiments, the second end 29b of the second linkage may have a projection or protrusion that is configured to fit within an inner channel defined by the body of the second spring 25 to help locate the second spring 25 between the second end 29b and the wall 24.

The second and first springs 27 and 25 may be arranged and configured so that when a user provides a downward force from sitting or leaning on the seating surface 4 that is at and/or above a pre-selected level, the first spring 27 is compressed. The spring 27 can be connected to the first linkage within the inner channel 29c of the second linkage 29 such that compression of the first spring drives motion of the first linkage 22 so that the actuator is moved to its unlocking position even though the first end 29a of the second linkage is still within a recess 31a to prevent rotation of the rotatable member 31 and shaft 37 and thereby prevent height adjustment of the seating surface 4.

If no such force is provided via downward pressure or force on the seating surface 4 provided by a user, the first spring 27 will not compress, but stay uncompressed within the inner channel 29c of the second linkage 29 (stay at its first length and not be moved to a second, shorter length via compression). In such a condition, when a user provides a force on the actuator 11 to drive motion of the actuator from its locked position to its unlocked position, the motion of the actuator 11 will drive motion of the first linkage 22 that will cause the second linkage 29 to move away from the rotatable member so that the first end 29a of the first linkage 29 is placed out of contact and/or engagement with the recesses 31a and projections 31b of the rotatable member 31 to unlock the rotatable member 31 and allow the rotatable member 31 to rotate. Motion of the second linkage 29 away from the rotatable member causes the second end 29b of the second linkage 29 to move closer to the wall 24, which compresses the second spring 25 so that the second spring 25 changes in length from a first length to a second shorter length.

After the rotatable member 31 is unlocked and free to rotate via the motion of the second linkage 29 driven by motion of the actuator 11, a user may provide an upward force on the seating surface 4, seat frame 5, or portion of the base (e.g. first or second upper elements 9a or 9b) to cause the shaft 37 to move linearly upwardly, which causes the shaft 37 to rotate in a first rotational direction as the shaft 37 is moved linearly in the upwardly direction due to the threads 37a of the shaft mating with threads 7f. The user can also provide a downward height adjustment by allowing gravity to cause the seating surface 4 to drop in height and/or providing a force to help control this downward motion of the seating surface 4 at a desired speed. The downward motion of the seating surface 4 can occur via linear downward motion of the shaft 37 into the channel of the upwardly extending member 7e. As the shaft 37 moves linearly downwardly, the shaft 37 can rotate in a second rotational direction due to the mateable threads 37a and 7f of the shaft 37 and upwardly extending member 7e. The second rotational direction of the shaft may be a direction that is opposite the first rotational direction of the shaft (e.g. the second rotational direction can be clockwise when the first rotational direction is counterclockwise and is counterclockwise when the first rotational direction is clockwise).

After the seating surface 4 is adjusted to a desired position, the user may release the actuator 11. The release of the actuator 11 may result in the actuator 11 moving back to its locked position (e.g. its original position or first position) due to biasing force provided by the second spring 25. For instance, the compression of the second spring 25 is released so that the second spring 25 decompresses from its second length to its longer first length upon a user releasing the actuator 11. This decompression of the second spring 25 can force the second linkage 29 to return to its locked position so that its first end 29a is located within a recess 31a of the rotatable member 31 in response to the user releasing the actuator 11. The motion of the second linkage 29 drives motion of the first linkage 22 attached to the second linkage 29 and the actuator 11 attached to the first linkage 11 so that the actuator 11 also moves back to its locked position as the second linkage 29 is returned to its locking position via the biasing force provided by the second spring 25.

It should be understood that embodiments of the seating device may be configured to meet different design criteria. For instance, the shape and size of the seating surface, the structure of the seat frame 5, and/or the size and shape of the base may be adjusted to meet a particular set of design criteria. As another example, the actuator 11 may be any type of handle or other type of actuator 11 that is connectable to the first linkage 22, such as a button, lever, knob, or other actuator. As yet another example, the shape, size, and material composition of the first and second linkages 22 and 29 may be any of a number of shapes and sized for meeting a particular set of design criteria. As yet another example, the size, shape, and type of the first and second springs 25 and 27 can be adjusted to meet a particular set of design criteria. As yet another example, the number, size, shape, and type of ring elements can be any of a number of different shapes, sizes, and material compositions. As yet another example, the attachment of the shaft 37 to the rotatable member 31 can be any of a number of suitable fastening mechanisms for meeting a particular set of design criteria, including welding, adhesive, forming these two parts so that that they are integrally formed, cast, or otherwise attached, or via at least one fastener or other type of fastening mechanism. As yet another example, the ring elements may be any type of annular structure having an inner opening that is sized so that the shaft 37 can pass through the ring element for attachment of the ring element to the shaft. For instance, the ring elements of the first and/or second set of ring elements 33 and/or 34 can be circular, elliptical, or polygonally shaped. The upper and lower surfaces of each ring element that may contact ring elements adjacent to that ring element may also be shaped so that such surfaces are smooth or have one or more depressions or other structure to facilitate the inducement of a pre-selected range or pre-selected amount of friction when the ring elements are pushed closer to each other during lowering of the seating surface 4 and seat frame 5. Therefore, while certain exemplary embodiments of seating devices and height adjustment mechanisms for seating devices and methods of making and using the same have been discussed and illustrated herein, it is to be distinctly understood that the invention is not limited thereto but may be otherwise variously embodied and practiced within the scope of the following claims.

What is claimed is:

1. A height adjustment device for a seating device comprising:
    an actuator;
    a first linkage connected to the actuator;
    a second linkage connected to the first linkage, the second linkage having a cavity, the second linkage having a first end and a second end opposite the first end of the second linkage;
    a rotatable member having a plurality of spaced apart projections that define a plurality of spaced apart recesses, each of the recesses sized and shaped to receive the first end of the second linkage for locking engagement with projections that define that recess;
    a shaft having a first end and a second end opposite the first end of the shaft, the second end of the shaft being attached to the rotatable member such that rotation of the shaft causes the rotatable member to rotate;
    wherein the shaft has at least one thread that is mateable with at least one thread defined in a portion of a base of the seating device such that linear motion of the shaft in a first direction causes the shaft to rotate in a first rotational direction during that linear motion of the shaft in the first direction of linear motion and linear motion of the shaft in a second direction of linear motion that is opposite the first direction of linear motion causes the shaft to rotate in a second rotational direction that is opposite the first rotational direction during linear motion of the shaft in the second direction of linear motion;
    a plurality of ring elements connected to the shaft to induce friction during motion of the shaft in one of the first direction of linear motion and the second direction of linear motion;
    a first spring positioned within the cavity of the second linkage; and
    a second spring positioned adjacent the second end of the second linkage to provide a biasing force that acts against the second end of the second linkage to bias the first end of the second linkage toward the rotatable member.

2. The height adjustment mechanism of claim 1, comprising:
    a plurality of ring elements connected to a housing that at least partially defines a cavity that at least partially encloses the shaft, the shaft passing through the ring elements connected to the housing to induce friction during motion of the shaft in one of the first direction of linear motion and the second direction of linear motion, the ring elements connected to the housing being spaced apart from each other and being positioned such that at least one ring element of the ring elements connected to the shaft is positioned between immediately adjacent ring elements connected to the housing; and
    the ring elements connected to the shaft being spaced apart from each other and being positioned such that at least one ring element of the ring elements connected to the housing is positioned between immediately adjacent ring elements connected to the shaft.

3. The height adjustment mechanism of claim 1, wherein the first spring is positioned within the cavity such that the first spring is compressible from a first length to a second shorter length, the first end of the second linkage maintaining a position within a recess of the rotatable member when the first spring is compressed to the second length of the first spring.

4. The height adjustment mechanism of claim 1, wherein the second spring is positioned to be compressible from a first length to a second shorter length when the actuator is moved from a first position to a second position and the first spring is maintained at the first length of the first spring.

5. The height adjustment mechanism of claim 4, wherein the first and second springs are positioned such that the first spring is compressible from the first length of the first spring to the second length of the first spring while the second spring is maintained at the first length of the second spring.

6. The height adjustment mechanism of claim 4, wherein the first spring is connected between the first linkage and the second linkage.

7. The height adjustment mechanism of claim 6, wherein the second spring is positioned between a wall and the second end of the second linkage.

8. The height adjustment mechanism of claim 1, comprising:
    a guide having a slot that receives a projection extending from the first linkage, the slot defining a path of travel of the first linkage such that the projection moves along the slot when the actuator is moved from the first position to the second position.

9. A height adjustment device for a seating device comprising:
    an actuator;
    a first linkage connected to the actuator;

a second linkage connected to the first linkage, the second linkage having a cavity, the second linkage having a first end and a second end opposite the first end of the second linkage;

a rotatable member having a plurality of spaced apart projections that define a plurality of spaced apart recesses, each of the recesses sized and shaped to receive the first end of the second linkage for locking engagement with projections that define that recess;

a first spring positioned within the cavity of the second linkage; and a second spring positioned adjacent the second end of the second linkage to provide a biasing force that acts against the second end of the second linkage to bias the first end of the second linkage toward the rotatable member;

the first spring being positioned within the cavity of the second linkage such that the first spring compresses from a first length to a second length that is shorter than the first length, the first end of the second linkage maintaining a position within a recess of the rotatable member when the first spring is compressed to the second length of the first spring, and the second spring is positioned to be compressible from a first length to a second shorter length when the actuator is moved from a first position to a second position and the first spring is maintained at the first length of the first spring, the first end of the second linkage moving away from the rotatable member such that the first end of the second linkage is moved out of engagement with the projections of the rotatable member when the second spring is compressed to the second length of the second spring.

10. The height adjustment mechanism of claim 9, wherein the first and second springs are positioned such that the first spring is compressible from the first length of the first spring to the second length of the first spring while the second spring is maintained at the first length of the second spring.

11. The height adjustment mechanism of claim 10, comprising:

a shaft having a first end and a second end opposite the first end of the shaft, the second end of the shaft being attached to the rotatable member such that rotation of the shaft causes the rotatable member to rotate;

the first end of the shaft being connectable to a base of the seating device such that rotation of the shaft results in height adjustment of a seat of the seating device.

12. A seating device comprising:

a seat;

a base connected to the seat to support the seat on a floor;

a height adjustment mechanism connected to the base such that actuation of the height adjustment mechanism facilitates height adjustment of the seat, the height adjustment mechanism comprising:

an actuator;

a first linkage connected to the actuator;

a second linkage connected to the first linkage, the second linkage having a cavity, the second linkage having a first end and a second end opposite the first end of the second linkage;

a rotatable member having a plurality of spaced apart projections that define a plurality of spaced apart recesses, each of the recesses sized and shaped to receive the first end of the second linkage for locking engagement with projections that define that recess;

a first spring positioned within the cavity of the second linkage; and a second spring positioned adjacent the second end of the second linkage to provide a biasing force that acts against the second end of the second linkage to bias the first end of the second linkage toward the rotatable member;

the first spring being positioned within the cavity of the second linkage such that the first spring compresses from a first length to a second length that is shorter than the first length when a downward force acts on the seat, the first end of the second linkage maintaining a position within a recess of the rotatable member when the first spring is compressed to the second length of the first spring, wherein the first spring is maintained at the first length of the first spring when the downward force does not act on the seat such that the second spring is compressed from a first length to a second shorter length when the actuator is moved from a first position to a second position, the first end of the second linkage moving away from the rotatable member such that the first end of the second linkage is moved out of engagement with the projections of the rotatable member when the second spring is compressed to the second length of the second spring when the actuator is moved from the first position to the second position.

13. The seating device of claim 12, wherein the first and second springs are positioned such that the first spring is compressible from the first length of the first spring to the second length of the first spring while the second spring is maintained at the first length of the second spring when the first spring is at the second length of the first spring.

14. The seating device of claim 12, wherein the height adjustment mechanism further comprising:

a shaft having a first end and a second end opposite the first end of the shaft, the second end of the shaft being attached to the rotatable member such that rotation of the shaft causes the rotatable member to rotate;

the first end of the shaft being connected to the base of the seating device such that rotation of the shaft results in height adjustment of the seat.

15. The seating device of claim 12, wherein the height adjustment mechanism further comprising:

a shaft having a first end and a second end opposite the first end of the shaft, the second end of the shaft being attached to the rotatable member such that rotation of the shaft causes the rotatable member to rotate, the first end of the shaft being connected to the base of the seating device such that rotation of the shaft in a first rotational direction results in a first linear motion of the shaft in a first linear direction as the shaft rotates in the first rotational direction and rotation of the shaft in a second direction results in a second linear motion in a second direction that is opposite the first linear direction as the shaft rotates in the second rotational direction;

a plurality of ring elements connected to the shaft to induce friction during motion of the shaft in one of the first direction of linear motion and the second direction of linear motion; and a plurality of ring elements connected to a housing that at least partially defines a cavity that at least partially encloses the shaft, the shaft passing through the ring elements connected to the housing to induce friction during motion of the shaft in one of the first direction of linear motion and the second direction of linear motion, the ring elements connected to the housing being spaced apart from each other and being positioned such that at least one ring element of the ring elements connected to the shaft is positioned between immediately adjacent ring elements connected to the housing; and the ring elements connected to the shaft being spaced apart from each other and being positioned such that at least one ring element of the ring elements connected to the housing is positioned between immediately adjacent ring elements connected to the shaft.

* * * * *